US006393839B1

(12) United States Patent
Agner

(10) Patent No.: US 6,393,839 B1
(45) Date of Patent: May 28, 2002

(54) PRESSURIZED MEDIUM DELIVERY DEVICE

(75) Inventor: Ivo Agner, Bad Homburg (DE)

(73) Assignee: LuK Fahrzeug-Hydraulik GmbH & Co. KG, Bad Homburg (DE)

(*) Notice: Subject to any disclaimer, the term of this patent is extended or adjusted under 35 U.S.C. 154(b) by 0 days.

(21) Appl. No.: 09/437,632

(22) Filed: Nov. 10, 1999

(30) Foreign Application Priority Data

Nov. 17, 1998 (DE) ........................................ 198 53 014
Nov. 27, 1998 (DE) ........................................ 198 54 818

(51) Int. Cl.[7] ............................ F16D 31/02; F04F 3/00; F04F 10/00; F04B 23/08

(52) U.S. Cl. ...................... 60/455; 417/199.2; 417/119; 137/247.49; 137/137

(58) Field of Search .......................... 60/325, 399, 455, 60/415, 470, 493, 698; 417/65, 87, 118, 119, 199.2, 313; 137/137, 247.41, 247.49

(56) References Cited

U.S. PATENT DOCUMENTS

| | | | | | |
|---|---|---|---|---|---|
| 298,805 | A | * | 5/1884 | Weeden | 137/137 X |
| 528,281 | A | * | 10/1894 | Wade | 60/415 |
| 1,293,604 | A | * | 2/1919 | Woolever | 137/247.41 X |
| 2,526,406 | A | * | 10/1950 | Pfauser et al. | 60/470 X |
| 3,207,675 | A | * | 9/1965 | Gladieux | 137/247.49 X |
| 3,723,027 | A | * | 3/1973 | Montelius | 417/313 |
| 4,222,440 | A | * | 9/1980 | Parker | 417/118 X |
| 4,332,532 | A | * | 6/1982 | Liska | 417/313 X |
| 4,612,957 | A | * | 9/1986 | Arndt et al. | 137/247.41 X |
| 4,614,480 | A | * | 9/1986 | Hardison | 417/199.2 |
| 5,417,063 | A | * | 5/1995 | Somers | 60/325 |
| 6,269,832 | B1 | * | 8/2001 | Besnard et al. | 137/137 |

* cited by examiner

*Primary Examiner*—John E. Ryznic
(74) *Attorney, Agent, or Firm*—Darby & Darby

(57) ABSTRACT

Pressurized medium delivery device with a pump, a suction pipe, at least one pressure pipe and a pressurized medium supply volume in a pressurized medium supply container.

24 Claims, 8 Drawing Sheets

PRESSURIZED MEDIUM DELIVERY DEVICE

Figure 1:
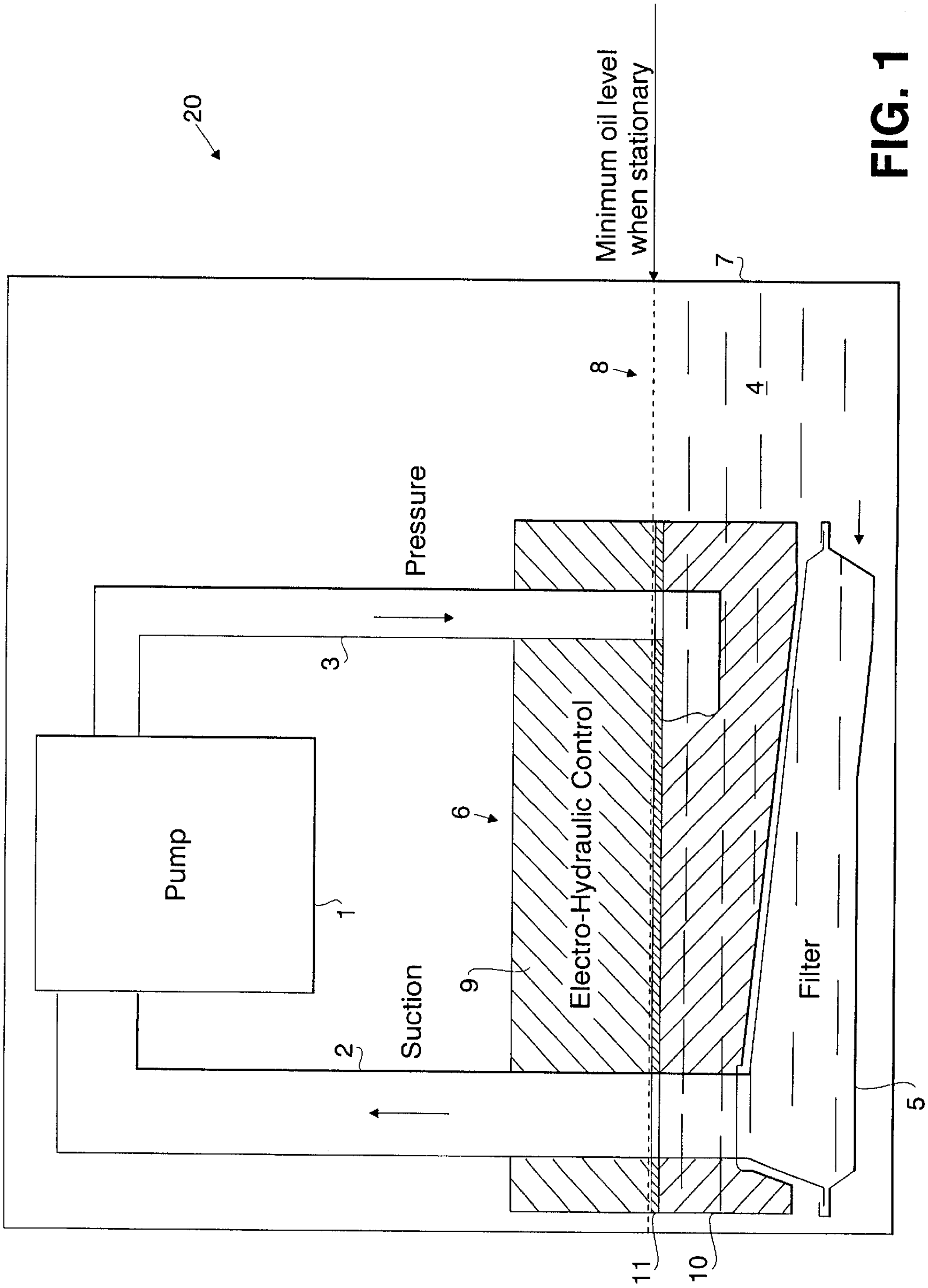

The invention relates to a pressurised medium delivery device, consisting of a pump with a suction pipe, at least one pressure pipe and a pressurised medium supply container which is filled at least partially with a quantity of pressurised medium.

Pressurised medium delivery devices of the type mentioned here are known from various applications. They have a pump which sucks up through a suction pipe which projects into the supply reservoir—and generally through a filter device—a pressurised medium such as hydraulic oil from a pressurised medium supply and supplies this pressurised medium through a pressure pipe to a consumer.

The pump is generally mounted above the oil sump. It sucks up oil from the oil sump through the filter and serves as the pressure and volume flow supplier for hydraulic or electro-hydraulic control systems. These controls contain slide valves which slide with play in bores, with the play providing gaps which are indeed narrow but allow the hydraulic oil to pass through. Generally the controls are located at least in part above the oil sump so that when switching off the system the control can slowly empty and air penetrates into the ducts. Thus in the end the suction pipe of the pump can be emptied by air flowing back from the control into the pressure pipe through the pressure pipe/pump/suction pipe route and where applicable filter. This has the result that particularly when starting up the pump when the oil is cold the pump first has to expel the air from the suction pipe. As a result of the high elasticity of air it takes a relatively long time until the pump can build up through its delivery capacity a corresponding vacuum to suck the oil up through the filter. This causes a correspondingly long time delay for the build-up of pressure. Furthermore by sucking up an air-oil mixture with a very high proportion of air a lot of starting noise may arise.

On the other hand systems are known which avoid an emptying of the suction system by using a non-return valve on the suction pipe or in the pressure pipe. The drawback here is the higher suction resistance or through-flow resistance which arises, particularly when cold, which leads to pressure losses and thus to a lower delivery or greater power consumption of the pump. Furthermore with a non-return valve the functional reliability is very quickly impaired, e.g. through dirt at the sealing points, so that air can penetrate into the system and the intake tract thereby runs empty.

Systems are also known wherein the pump was placed with the intake pipe directly and completely underneath the oil surface in the sump, or at least the intake pipe is made extremely short. This is however often not possible through reasons of space.

It is therefore the object of the invention to provide a pressurised medium delivery device of the type mentioned above which does not have these drawbacks and which is improved compared with the aforesaid measures.

This is achieved through a pressurised medium delivery device having a pump, suction pipe, at least one pressure pipe and pressurised medium supply volume in a pressurised medium supply container.

The pressurised medium delivery device according to the invention is characterised in that the first openings of the suction and pressure pipe remote from the pump are arranged below the surface of the pressurised medium of the pressurised medium supply and project at least when the system is stationary below this surface.

Furthermore the pressurised medium delivery device is characterised in that the at least one pressure pipe has a part which is connected to the pump and is mounted above the surface of the pressurised medium supply volume in the pressurised medium supply container, and has a further part which is mounted at least in part below the surface of the pressurised medium supply volume.

According to the invention the part of the at least one pressure pipe below the surface of the pressurised medium supply volume has a connection with the pressurised medium in the pressurised medium supply volume.

In a preferred embodiment of the invention at least one pressure pipe, leading from the pump, is mounted at least over a part of its extension below the surface of the pressurised medium supply volume and where applicable then leads out again beyond the surface.

A pressurised medium delivery device is particularly preferred where the pressurised medium region inside the pump, the suction pipe and the partial region above the surface of the pressurised medium supply volume of the at least one pressure pipe has no opening for a pressurised medium outflow.

According to the invention the at least one pressure pipe only continues to the pressurised medium consumer after projecting under the surface of the pressurised medium supply volume.

One embodiment is preferred where the at least one pressure pipe has below the surface of the pressurised medium supply volume connecting means to provide a fluid connection with the pressurised medium.

According to the invention a pressurised medium connection between the pressurised medium in the pressure pipe and the pressurised medium in the pressurised medium supply volume can be produced by means of the connecting means.

In a preferred embodiment the pressurised medium connection can be interrupted or switched off.

In a further preferred embodiment, the at least one pressure pipe leads to at least one pressurised medium consumer after the connecting means of the at least one pressure pipe, seen in the flow direction.

According to the invention the connecting means represent a pressurised medium resistance opening.

In a preferred embodiment the resistance is represented by at least one leakage gap of a valve device.

According to the invention the connecting means represents a closable resistance.

An embodiment is preferred wherein the resistance opens with flow in one pressurised medium flow direction and closes in an opposite pressurised medium flow direction.

According to the invention in a further embodiment the resistance closes with flow in the flow direction from the pressure pipe to the supply quantity and opens with flow in the flow direction from the supply quantity to the pressure pipe.

In another design according to the invention the resistance is open in the event of flows in both directions.

An embodiment is preferred where the resistance is a non-return valve.

In a further embodiment the non-return valve is a leaf spring or spring tongue or plate valve.

In another design according to the invention the non-return valve is a ball or cone seat valve.

In another preferred design the non-return valve is a slide valve.

According to the invention the non-return valve closes through spring force and/or weighting and opens through compression force.

Particularly preferred is the design with a pump, with a suction pipe, with at least one pressure pipe, a pressurised medium supply volume and a pressurised medium container wherein these are arranged in relation to the surface of the pressurised medium supply so that they represent a system of "communicating pipes" in their method of operation.

Furthermore a pressurised medium delivery device is preferred, more particularly with a pump, with a suction pipe, with at least one pressure pipe, a pressurised medium supply volume and a pressurised medium container wherein these are arranged in relation to the surface of the pressurised medium supply so that the geodetic pressure is balanced in this region within the pressurised medium.

In another pressurised medium delivery device according to the invention, more particularly with a pump, with a suction pipe, with at least one pressure pipe, a pressurised medium supply volume and a pressurised medium container, these are arranged relative to the surface of the pressurised medium supply so that (in their method of operation) the intake area is prevented from running empty (at least when the vehicle is stationary).

In a particularly preferred embodiment the device is arranged in relation to the surface of the pressurised medium supply so that the intake area is prevented from running empty even if the control is idling at least in part.

According to the invention the device is arranged in relation to the pressurised medium supply surface so that the intake area is prevented from running empty even without a non-return valve in the intake region and/or pressure region.

Figure 1A:
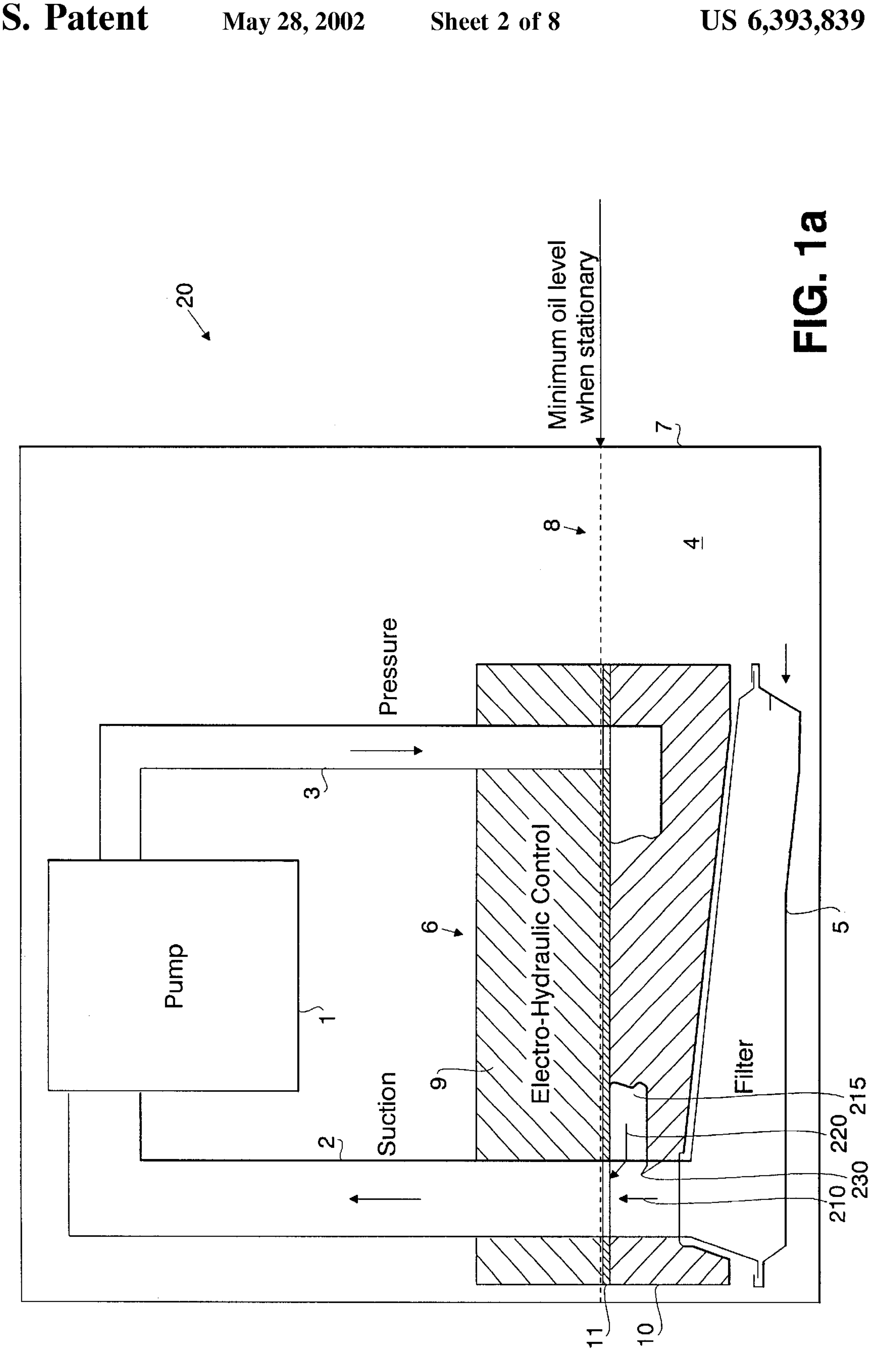
Figure 2:
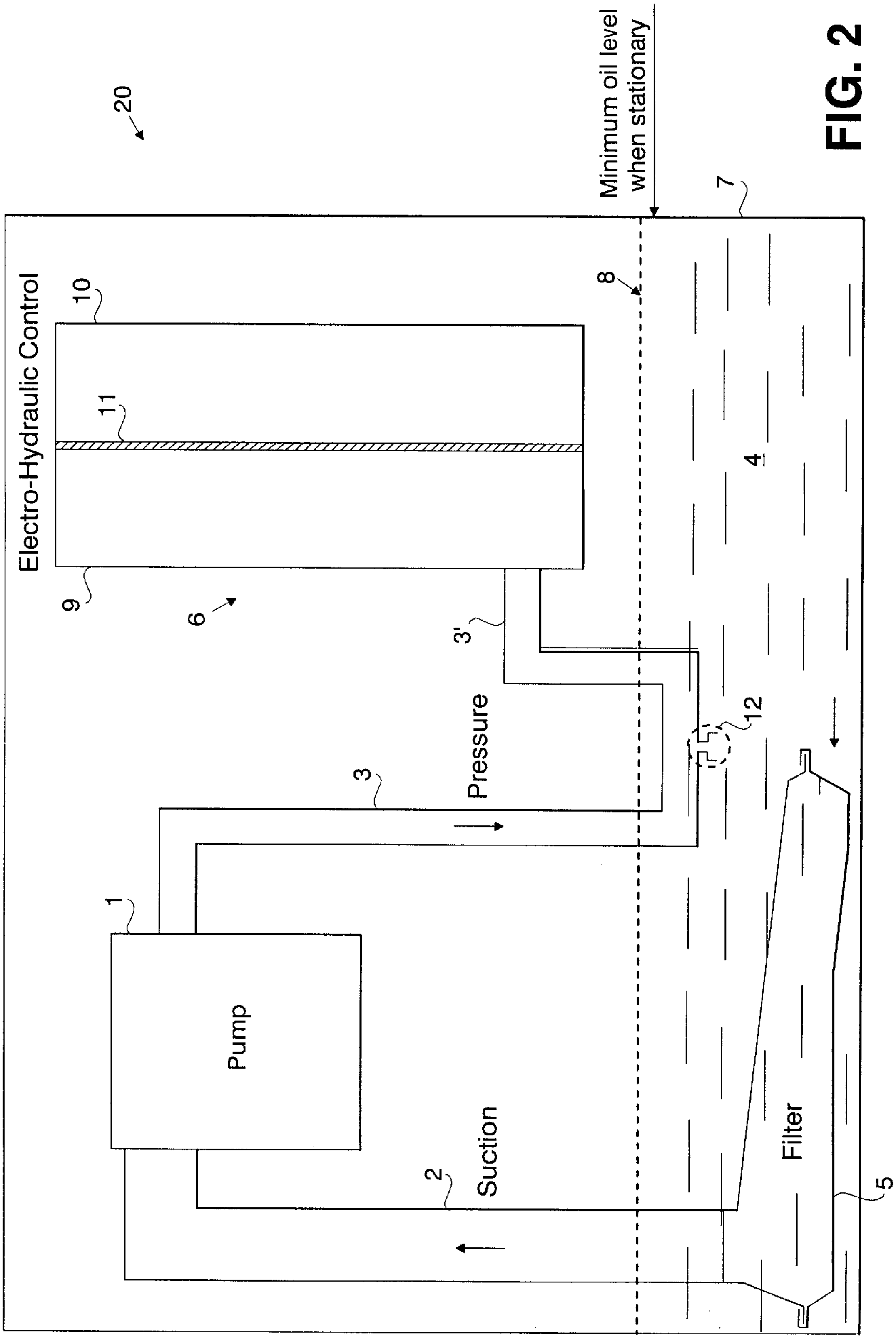
Figure 3:
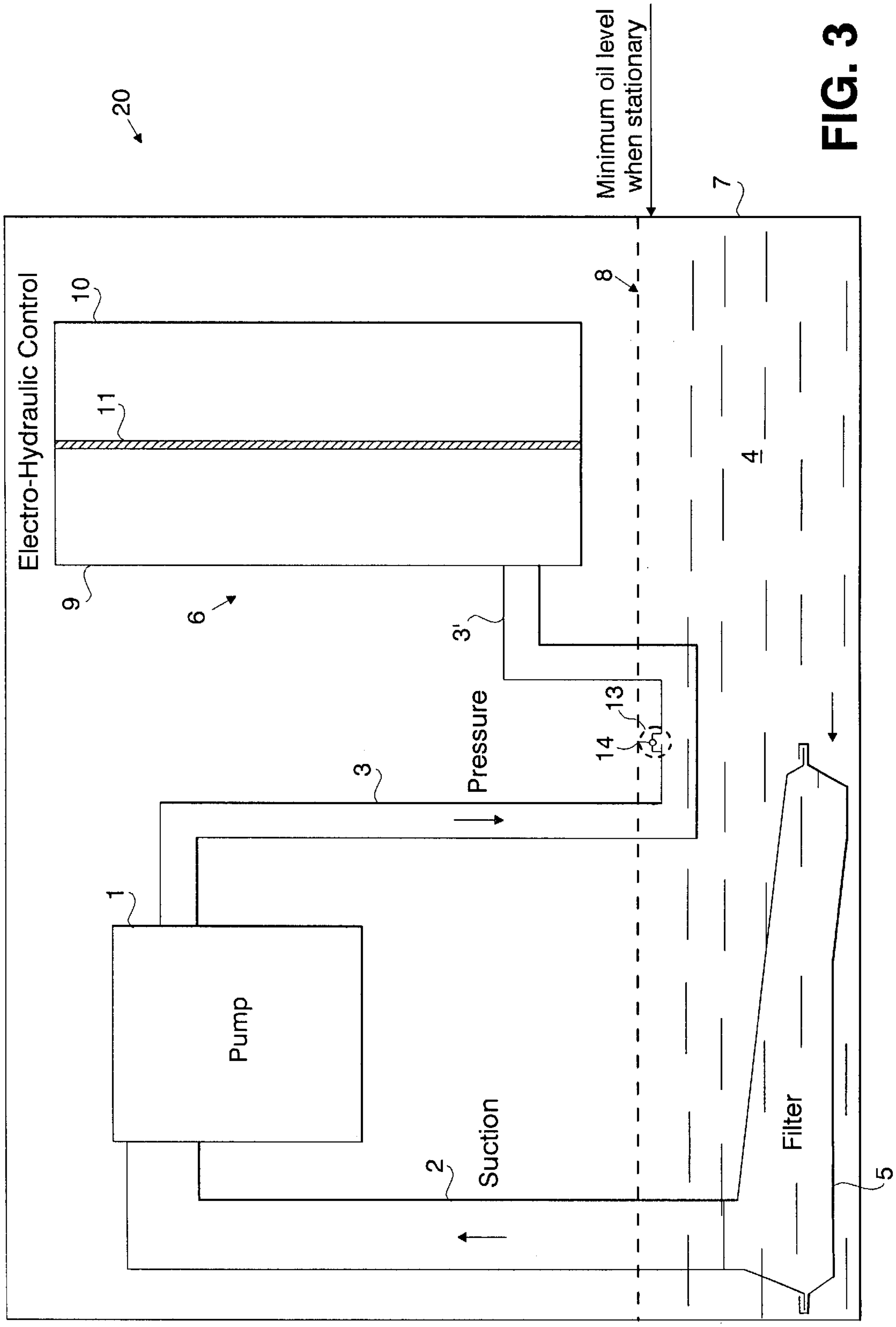
Figure 3A:
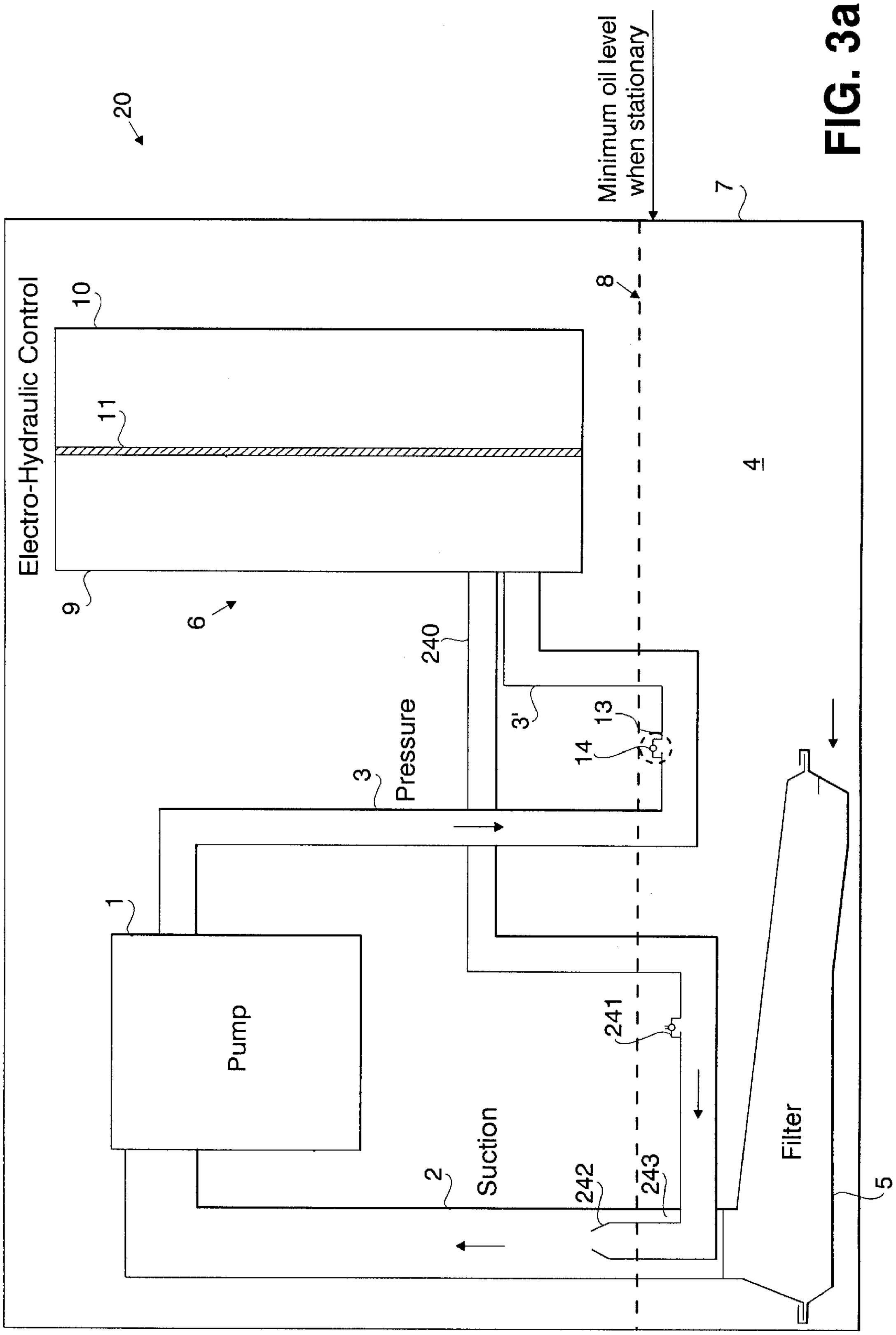

The invention will now be explained in further detail with reference to the following drawings in which:

| | |
|---|---|
| FIG. 1 | is a diagrammatic illustration of a pressurised medium delivery device in accordance with the invention; |
| FIG. 1a | is a diagrammatic illustration of a pressurised medium delivery device with an injector; |
| FIG. 2 | shows a further embodiment of the pressurised medium delivery device; |
| FIG. 3 | shows a further embodiment of the pressurised medium delivery device; |
| FIG. 3a | shows a further embodiment of the pressurised medium delivery device with injector; and |
| FIGS. 4a to 4e | show embodiments of non-return valves. |

The illustration in FIG. 1 shows a pressurised medium delivery device 20 with a pump 1, which can also be a pumping device, such as a multi-circuit pump, a suction pipe 2, a pressure pipe 3, a pressurised medium supply container 7 with a pressurised medium volume 4, a filter 5 and an electro-hydraulic control 6, here shown as a valve block. The control 6 can be a control unit with valves and can also contain where necessary electronic elements.

The pump 1 sucks up the pressurised medium from the pressurised medium supply 4 through the filter 5 by means of the suction pipe 2 which passes through the electro-hydraulic control to the filter 5, and delivers it through the pressurised medium pipe 3 and through a part 9 of the hydraulic control 6 into a part 10 of the hydraulic control.

It is thereby advantageous if the mouth of the pressurised medium pipe 3 is arranged inside the hydraulic control 6 below the surface 8 of the pressurised medium 4, that is below the minimum possible oil level particularly when the system, such as e.g. a motor vehicle, is stationary and then after this—in the flow direction from the pump to the consumer—has a connection such as a leakage point, below the oil surface.

The end of the suction pipe 2 is likewise set in an advantageous embodiment below the surface of the pressurised medium 4 in the pressurised medium supply container 7, with the surface of the minimum oil level when the system is stationary in this figure being shown by the line 8.

The electro-hydraulic control 6 consists of a valve block with two parts 9 and 10 and with an intermediate seal 11. The part 9 is located above the pressurised medium surface and the part 10 is located below the pressurised medium surface. The two parts contain valves (not shown here) for controlling the operating components, by way of example in an automatic transmission of a motor vehicle, an anti-rocking system, an ABS system or an automated clutch.

The valves, if they are formed as slide valves, have gaps between the valve bushes and valve pistons which form leakage paths. The part 9 of the hydraulic control which is located above the pressurised medium surface 8 in the pressurised medium supply container 7, can run empty through leakage through these gaps after switching off the system and thus after a certain time. These valves which are located above the oil level 8 become filled with air after a certain time whilst the control parts in block 10, which do indeed also have leakage gaps but these are below the oil level 8, remain filled with oil. Since with the variation of the pressurised medium delivery device illustrated in FIG. 1 the pressure pipe 3 is inserted into the control so that it only has its interface, such as a connection with the so-called 'untight' slide valves, below the oil level 8, a type of siphon arises and the intake pipe is prevented from running empty.

In a preferred use this is achieved in that the pressure pipe insert 3 into the gearbox control 6 is hermetically sealed up to the block 10, designed for example as a labyrinth plate, which is set completely below the oil level 8 (when the vehicle is stationary).

It is advantageous for a functioning siphon if the intake pipe 2, the pump 1 and the pressure pipe 3 or the ducts in the block 10 up to a first slide valve are hermetically sealed under oil, at least when the vehicle is stationary.

FIG. 1*a* shows a variation of the pressurised medium delivery device of FIG. 1 wherein in addition to the suction pipe having the oil intake flow 210, an injector pipe 215 is shown having the injector oil flow 220. With injectors of this kind the effect is utilised where for example the excess oil flow, such as of a flow regulating valve, which is not required in the hydraulic control for the control function, is used for charging up the suction region of the pump, and the velocity of the oil flow 220 draws along the oil flow 210 out from the intake area thereby making the suction work of the pump easier. Injectors of this kind are known. It is important for the invention that the inlet opening of the injector is in the suction area after the control has had contact with the leakage spots of the slide valves below the oil surface. In FIG. 1*a* an inclined edge 230 which projects into the intake pipe 2 indicates the structural deflection of the injector oil flow 220 relative to the oil flow 210 drawn in through the filter.

FIG. 2 shows a further embodiment of the pressurised medium delivery device according to the invention wherein the same parts are provided with the same reference numerals. The pump 1 again sucks pressurised medium out from the supply container 7 through the suction pipe 2 and through the filter 5. The pressurised medium is supplied through the pressure pipe 3 to the electro-hydraulic control 6 which again consists of a divided valve block 9 and 10 with the valves (not shown here). In this illustration the electro-hydraulic control 6 is not partly below the oil level 8 but for reasons of space is arranged completely above the oil level 8. The pressure pipe 3 is first supplied from the pump under the oil level 8 where a resistance opening 12 is formed below the oil level with a passage of the pressurised medium from the pressure pipe to the pressurised medium in the oil reservoir 4. The pressure pipe 3 then passes up beyond the oil level 8 into the hydraulic control 6. This device has the advantage when for reasons of space it is not possible to arrange the hydraulic control 6 at least in part in the oil sump so that the variation of FIG. 1 cannot be realised.

The complete hydraulic control 6 can thus run empty when the system is stationary. In order according to the invention to prevent the intake tract of the pump 1 including the suction pipe 2 from running empty, the pressure pipe 3 before entering the control 6 runs below the surface 8 of the oil sump 4, and a connection is made with the oil sump 4 through the opening 12. Thus the part 3' runs empty only to the oil level and the pump does not. This opening 12 can in its method of operation be a hydraulic resistance, such as for example a diaphragm or throttle. A type of siphon can also be produced in this way.

FIG. 3 shows a particularly preferred embodiment of the pressurised medium delivery device according to the invention. As with FIGS. 1 and 2 the same components are again provided with the same numbers so that it is not necessary to repeat the description of the known components. Instead of the hydraulic resistance 12 of FIG. 2 which represents an open connection with the oil reservoir 4, in FIG. 3 a closable connection 13 is shown, for example in the form of a non-return valve. When pressure is present in the pressure pipe 3 the opening is closed by a non-return closing element such as for example a ball 14. This design has the advantage that no leaks occur to the oil reservoir 4 under pressure.

FIG. 3*a* shows an expansion of the pressurised medium delivery device of FIG. 3 wherein the same parts here are also not repeated in the description. In addition to the arrangement in FIG. 3 a return line of an injector device is shown here which runs from the electro-hydraulic control first with a pipe 240 above the surface of the oil supply, is then guided under the surface of the oil supply and then has below this surface a connection 241 similar to the connection 14 of FIG. 3. After this the injector pipe is continued into the suction pipe of the pump whereby the injector is then formed inside the suction pipe through a deflection 243 and a nozzle shape 242. Instead of the connection 241 which is shown here as a non-return valve, an open connection can be used equally as good, such as shown in FIG. 2 by the opening 12. It is important to the invention that after the injector pipe projects below the supply surface a connection 241 can be made with the oil supply so that when the pipe 240 runs empty the oil level in same only drops to the oil level of the supply device, and then the oil level in the remaining injector pipe and also the overall oil level in the pump device remain. With no flow through the injector, i.e. when the vehicle is parked, the ball in the connection 241 has dropped down through gravity for example so that the injector pipe is connected to the oil in the supply container. When oil flows through the injector, i.e. when the vehicle is operated and when the control is operated, the pressure in the injector pipe will press the ball inside the connecting valve 241 upwards and thus provide the injector oil flow, without loss into the supply medium, completely to the intake area of the pump.

FIG. 4 shows some preferred embodiments of the non-return valves.

Figure 4A:
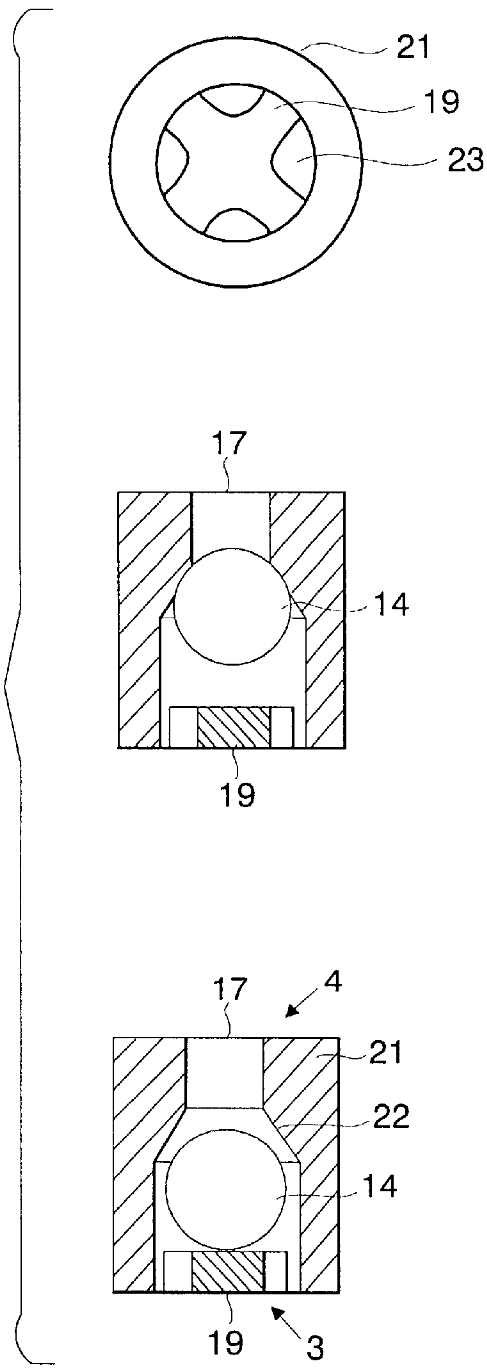

FIG. 4*a* thus shows a ball-type non-return valve with a valve sleeve 21 in which a cone seat 22 is arranged in front of the connecting opening 17. A ball 14 is mounted movable inside the valve sleeve 21. The valve sleeve 21 is closed at its end opposite the connecting opening 17 through a cross-shaped closure disc 19 so that the ball 14 is enclosed inside the valve sleeve 21, but pressurised medium can flow through the openings 23 which the cross-shaped closure disc 19 forms with the valve sleeve 21, and thus unrestricted through the valve sleeve.

If no flow and thus no excess pressure prevails in the pressure pipe 3 then the ball 14 can rest e.g. through gravity on the cross-shaped disc 19, and the pressurised medium in the pressure pipe 3 is connected to the pressurised medium in the pressurised medium supply 4 so that no air can enter into the pressure pipe 3. This state corresponds to the stationary state of the system, e.g. to the state in the automatic gearbox of a parked vehicle. If the pump 1 during operation of the system delivers pressurised medium to the control 6, then the ball 14 is pressed against the cone seat 22 by the pressure built up in the pressure pipe 3 and the connection to the pressurised medium in the supply container becomes closed so that not even the smallest amounts of pressurised medium are lost at this point to the supply container, but the entire pump delivery flow is passed to the consumer, such as the electro-hydraulic control and the hydraulic operating elements of an automatic gearbox operated thereby.

Figure 4B:
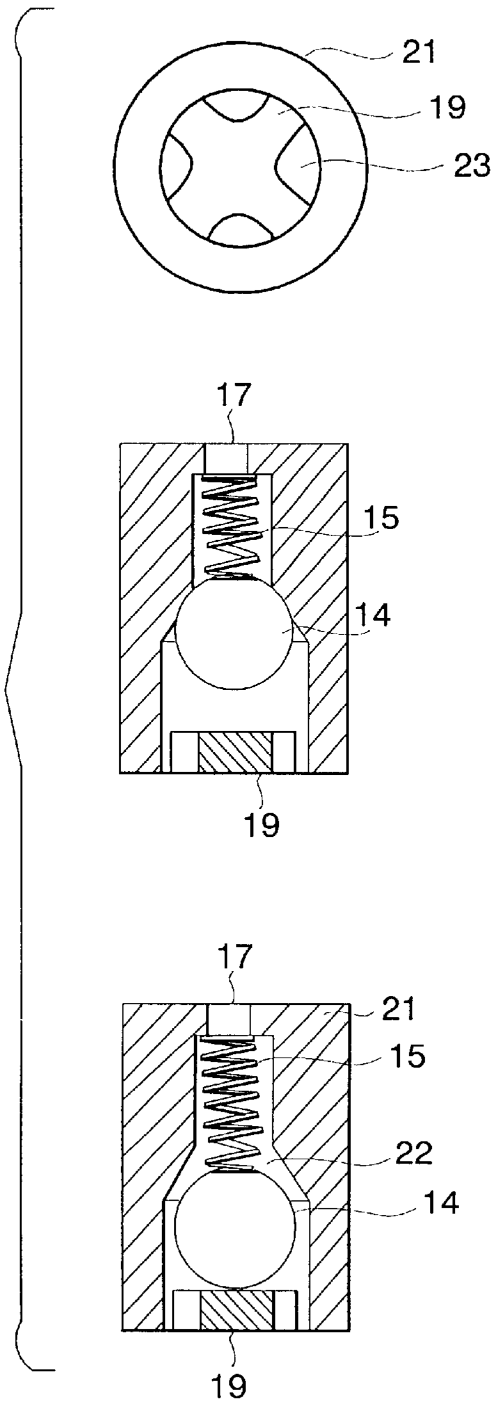

FIG. 4*b* shows a non-return ball valve which contains a compression spring 15 in addition to the structural elements in FIG. 4*b*. This valve also keeps open the connection between the pressure pipe 3 and the pressurised medium supply 4 without the action of the gravity of the ball in the pressureless state of the pressure pipe 3. Under pressure and under a flow force the ball 14 is pressed against the force of the spring into the seat 22 and thus the connection is closed.

Figure 4C:
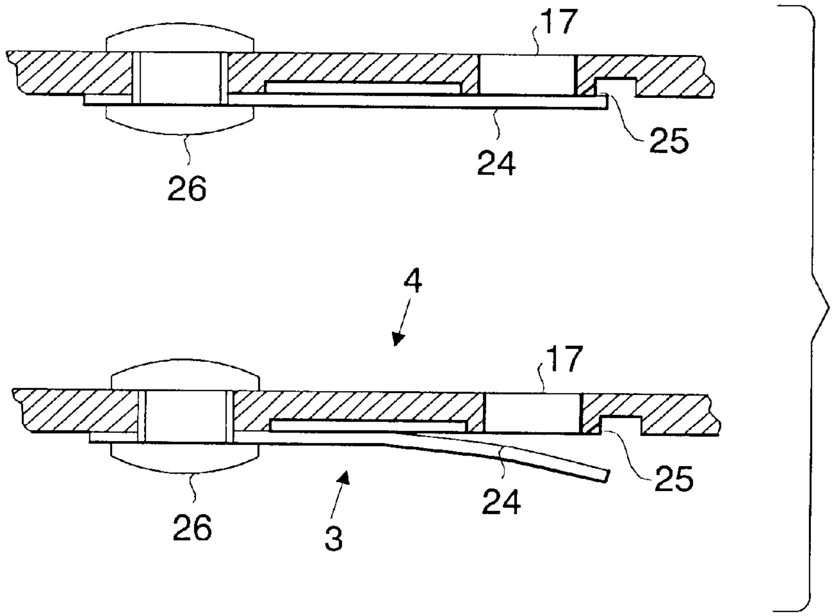

FIG. 4*c* shows a non-return valve designed as a spring tongue valve. A tongue-like metal or plastics leaf 24 which is pre-shaped through spring tension is attached by a fastening element 26 inside the pressure pipe 3 so that in the pressureless state in the pressure pipe 3 the connection 17 is open opposite a sealed seat formation, such as e.g. a sealing bead 25 on the connection 17 to the supply 4. The tongue-like valve leaf is pressed under pressure against its spring force to in front of the sealed seat formation 25 and thus closes the connecting opening 17 to the pressurised medium supply.

Figure 4D:
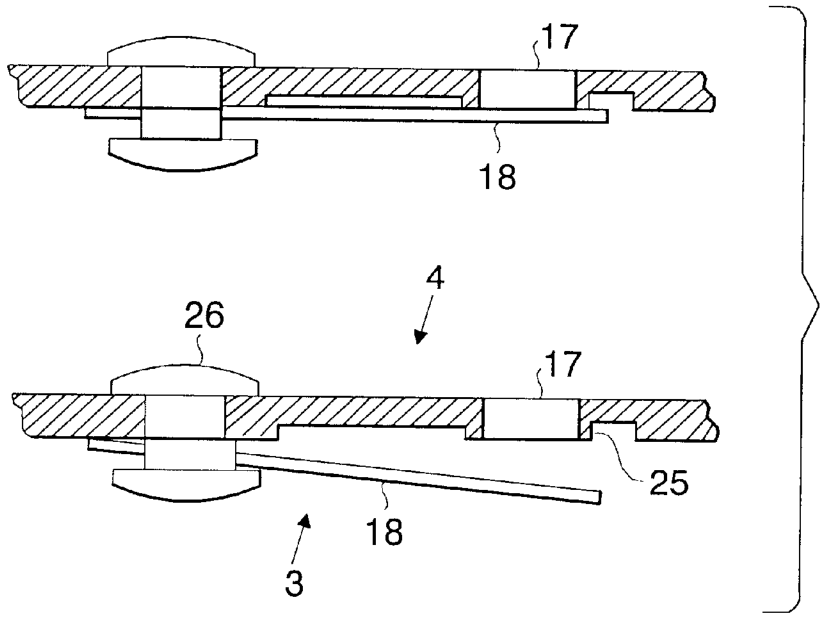

In FIG. 4*d*, instead of a valve leaf bent up by spring force, a valve leaf 18 is shown which is folded down through gravity. Otherwise the valve leaf 18 is pressed in the same way as in FIG. 4*c* under pressure in the pressure pipe 3 against the seat 25 and the opening 17 is closed.

Figure 4E:
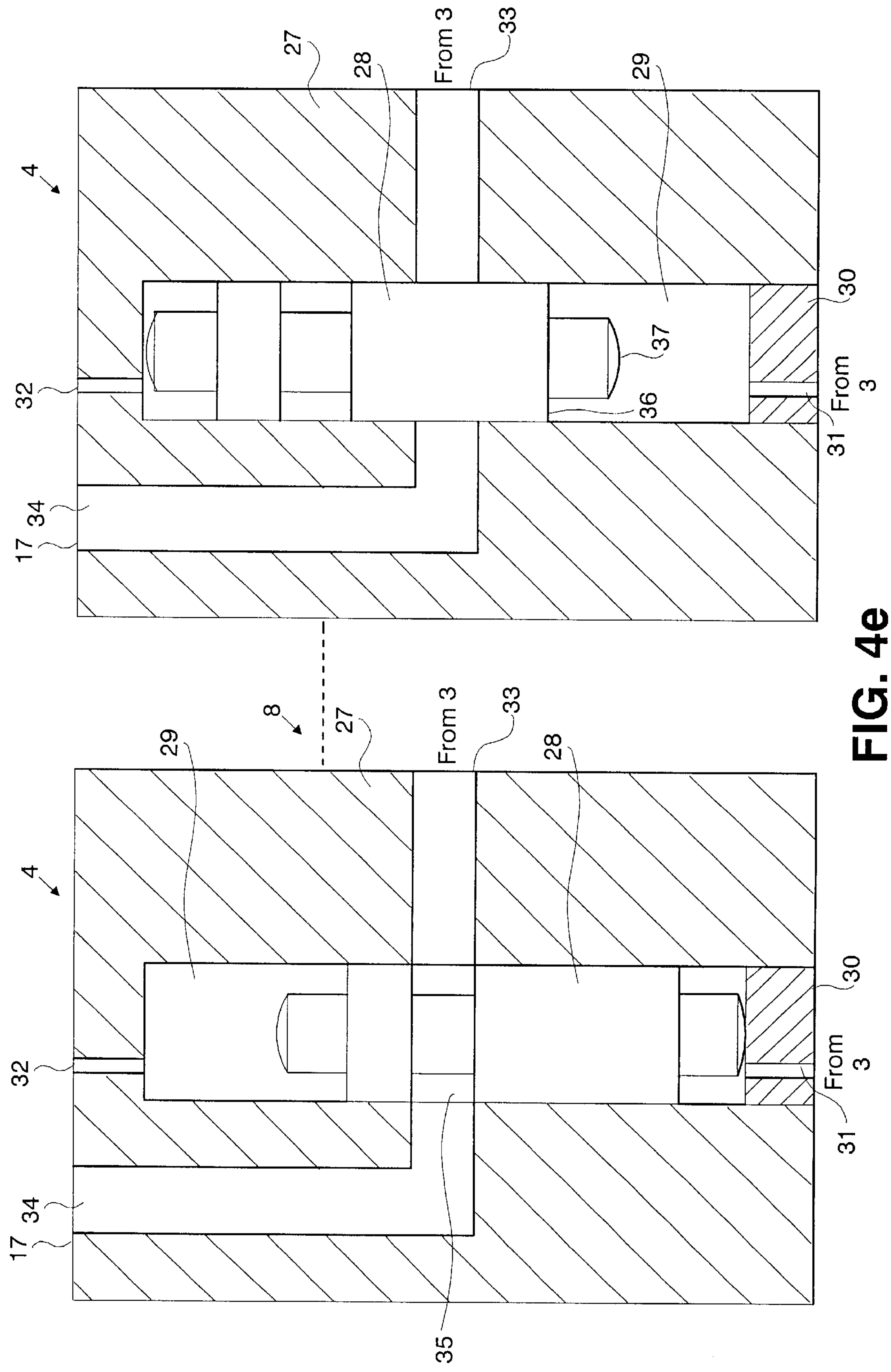

FIG. 4*e* shows an embodiment of the non-return valve as a slide valve.

A valve piston 28 is mounted displaceable in a bore 29 inside a valve housing 27. The valve bore 29 is closed by a stopper 30 which contains an opening 31. The valve bore 29 has a further opening 32 at the upper end of the valve block 27. In the valve block 27 the valve bore 29 which contains the valve piston 28 is passed, cut through or crossed by a pressurised medium pipe 33. The pressurised medium pipe 33 passes into a further pressurised medium pipe 34 which opens in the opening 17 to the pressurised medium supply 4.

In the left hand illustration of FIG. 4*e* the piston 28 is positioned so that a circumferential indentation 35 in the piston 28 allows the pressurised medium to flow through in the pipe 33. In the right hand illustration the piston 28 shuts off the pipe 33. The valve block entrance from the pipe 33 and the opening 31 in the stopper 30 are connected to the pressure pipe 3, the opening 32 and the valve block exit 17 of the pipe 34 are connected to the pressurised medium supply 4.

If no pressure prevails in the pressure pipe 3 then the valve piston 28 is in the opened position (left illustration) e.g. through the force of its weight. This piston position can however also be achieved apart from by weight by a spring (not shown here) above the piston.

If pressure prevails in the pressure pipe 3 then this pressure acts through the bore 31 onto the surfaces 36 and 37 of the piston.

The piston is thereby brought into the closed position (right illustration) against weighting, against any possible spring force and against the approximately atmospheric pressure in the supply container 4 acting through the bore 32, and the connection from the pressure pipe 3 to the pressurised medium in the supply 4 (opening 17) becomes closed.

It should be noted that in this design owing to the slide valve gaps the valve block/valve piston unit has to stand at least up to above the level of the bore 33 below the pressurised medium supply level 8 in order to prevent air from entering the pressure pipe 3 when the system is stationary. The opening 32 and the valve block exit 17 can also lie completely below the oil level.

It is advantageous for all the versions of the siphon formation of this pressurised medium delivery device shown here if the intake pipe is substantially prevented from running empty. Thus this invention compared to other solutions provides an economical functionally reliable method of preventing empty running.

The patent claims filed with the application are proposed wordings without prejudice for obtaining wider patent protection. The applicant retains the right to claim further features disclosed up until now only in the description and/or drawings.

References used in the sub-claims refer to further designs of the subject of the main claim through the features of each relevant sub-claim; they are not to be regarded as dispensing with obtaining an independent subject protection for the features of the sub-claims referred to.

The subjects of these sub-claims however also form independent inventions which have a design independent of the subjects of the preceding claims.

The invention is also not restricted to the embodiments of the description. Rather numerous amendments and modifications are possible within the scope of the invention, particularly those variations, elements and combinations and/or materials which are inventive for example through combination or modification of individual features or elements or process steps contained in the drawings and described in connection with the general description and embodiments and claims and which through combinable features lead to a new subject or to new process steps or sequence of process steps insofar as these refer to manufacturing, test and work processes.

What is claimed is:

1. A pumping system having a pump located above a fluid reservoir level of a fluid reservoir, the pump having an inlet pipe and an outlet pipe, the outlet pipe including a drain, wherein the drain includes one of a resistance opening, a leakage gap, and a valve to allow communication of the outlet pipe and the fluid reservoir.

2. The pumping system of claim 1, wherein at least a section of each of the inlet pipe and the outlet pipe is located below the reservoir fluid level.

3. The pumping system of claim 1, wherein the outlet drain valve closes when an outlet pipe fluid flow goes from the pump to the consumer, and the valve opens if an air back flow from the consumer to the pump appears.

4. The pumping system of claim 1, wherein the valve is a non-return valve.

5. The pumping system of claim 4, wherein the non-return valve is one of a leaf spring, spring tongue, plate valve, ball valve, cone seat valve, and spool valve.

6. The pumping system of claim 5, wherein the non-return valve opens through one of spring force and gravity and closes through compression force.

7. A pumping system having a pump located above a fluid reservoir level of a fluid reservoir, the pump having an inlet pipe and an outlet pipe, the outlet pipe including a drain disposed beneath the fluid reservoir level, wherein the drain includes one of a resistance opening, a leakage gap, and a valve beneath the fluid reservoir level to allow communication of the outlet pipe and the fluid reservoir before the outlet pipe continues to a hydraulic consumer.

8. The pumping system of claim 7, wherein at least a section of each of the inlet pipe and the outlet pipe is located below the reservoir fluid level.

9. The pumping system of claim 7, wherein the outlet drain valve closes when an outlet pipe fluid flow goes from the pump to the consumer, and the valve opens if an air back flow from the consumer to the pump appears.

10. The pumping system of claim 7, wherein the valve is a non-return valve.

11. A pumping system having a pump located above a fluid reservoir level of a fluid reservoir, the pump having an inlet pipe which in communication with an injector device and an outlet pipe, the outlet pipe including a drain disposed beneath the fluid reservoir level, wherein the drain includes one of a resistance opening, a leakage gap and a valve disposed beneath the fluid reservoir level to allow communication of the outlet pipe and the fluid reservoir before the outlet pipe continues to a hydraulic consumer, and the injector device including a drain disposed beneath the fluid reservoir level, wherein the drain includes one of a resistance opening, a leakage gap, and a valve disposed beneath the fluid reservoir level to allow communication of the injector device and the fluid reservoir before the injector device drain continues to a communication area with the inlet pipe.

12. The pumping system of claim 11, wherein at least a section of each of the inlet pipe and the outlet pipe and the injector device is located below the reservoir fluid level.

13. The pumping system of claim 11, wherein the outlet drain valve closes when an outlet pipe fluid flow goes from the pump to the consumer, and the valve opens if an air back flow from the consumer to the pump appears.

14. The pumping system of claim 11, wherein the injector device drain valve closes when an injector device fluid flow goes from the consumer to the inlet pipe, and the valve opens if an air flow appears from the consumer to the inlet pipe.

15. The pumping system of claim 11, wherein the valve is a non-return valve.

16. The pumping system of claim 15, wherein the non-return valve is one of a leaf spring, spring tongue, plate valve, ball valve, cone seat valve, and spool valve.

17. The pumping system of claim 15, wherein the non-return valve is one of a leaf spring, spring tongue, plate valve, ball valve, cone seat valve, and spool valve.

18. A pumping system comprising:

at least one pump having at least one inlet pipe and at least one outlet pipe;

a fluid reservoir having a fluid reservoir level; and wherein the at least one pump is disposed above the fluid reservoir level and a section of each of the inlet and outlet pipes is disposed below the fluid reservoir level, the at least one pump, the at least one inlet pipe and the at least one outlet pipe being located relative to the fluid reservoir level so that they form a system of communicating pipes during operation of the pumping system.

19. The pumping system of claim 18, further including an injector pipe.

20. A pumping system comprising:

at least one pump having at least one inlet pipe and at least one outlet pipe;

a fluid reservoir having a fluid reservoir level; and wherein the at least one pump, the at least one inlet pipe, the at least one outlet pipe are located relative to the fluid reservoir level so that the geodetic pressure is balanced inside an area of the fluid reservoir.

21. The pumping system of claim 20, further including an injector pipe.

22. The pumping system of claim 20, wherein the at least one pump is located in relation to the fluid reservoir level so that an inlet area is prevented from draining fluid even without an additional non-return valve in one of the inlet area and an outlet area.

23. A pumping system comprising:

a pump having an inlet pipe and an outlet pipe;

a fluid reservoir having a fluid reservoir level; and wherein the outlet pipe includes a drain having one of a resistance opening and a ball valve to allow communication of the outlet pipe and the fluid reservoir.

24. The pumping system of claim 23, wherein the drain has a U-shaped configuration.

* * * * *